US010936268B1

(12) United States Patent
Kouge

(10) Patent No.: US 10,936,268 B1
(45) Date of Patent: Mar. 2, 2021

(54) INFORMATION PROCESSING APPARATUS AND NON-TRANSITORY COMPUTER READABLE STORAGE MEDIUM USING OUTPUT SOUNDS REPRESENTING PASSWORDS

(71) Applicant: FUJI XEROX CO., LTD., Tokyo (JP)

(72) Inventor: Masahiro Kouge, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/748,831

(22) Filed: Jan. 22, 2020

(30) Foreign Application Priority Data

Aug. 23, 2019 (JP) .............................. JP2019-153051

(51) Int. Cl.
*G06F 3/12* (2006.01)
*H04W 4/021* (2018.01)
*G06F 21/35* (2013.01)

(52) U.S. Cl.
CPC ............ *G06F 3/1292* (2013.01); *G06F 3/126* (2013.01); *G06F 21/35* (2013.01); *H04W 4/021* (2013.01)

(58) Field of Classification Search
CPC ........ G06F 3/1292; G06F 3/126; G06F 21/35; H04W 4/021
USPC ................................ 358/1.1–1.18, 402, 474
See application file for complete search history.

(56) References Cited

U.S. PATENT DOCUMENTS

| 2002/0032652 A1* | 3/2002 | Aoki ..................... H04M 15/84 705/40 |
| 2007/0220255 A1* | 9/2007 | Igarashi .................. G06F 21/42 713/170 |
| 2015/0234624 A1* | 8/2015 | Nii ......................... G06F 3/1222 358/1.14 |
| 2015/0261491 A1* | 9/2015 | Hayano ................. G06F 3/1292 358/1.15 |
| 2017/0280003 A1* | 9/2017 | Haba ................... H04N 1/32117 |
| 2018/0203651 A1* | 7/2018 | Fukushima ............. G01S 7/006 |
| 2019/0306336 A1* | 10/2019 | Takenaka ........ H04W 12/00522 |

FOREIGN PATENT DOCUMENTS

JP   2014180792   9/2014

* cited by examiner

*Primary Examiner* — Gabriel I Garcia
(74) *Attorney, Agent, or Firm* — JCIPRNET

(57) ABSTRACT

An information processing apparatus includes a processor. The processor is configured to: accept, from a mobile terminal device carried by a user, identification information that enables identification of the user, positional information of the mobile terminal device, and an image forming instruction; generate sound authentication information for authenticating the accepted image forming instruction and cause an image forming apparatus that is present within a predetermined range of the accepted positional information to output a sound representing the sound authentication information; and cause the image forming apparatus to perform an image forming operation if the sound authentication information and authentication information that is input by using the mobile terminal device satisfy a predetermined relationship.

20 Claims, 13 Drawing Sheets

FIG. 10
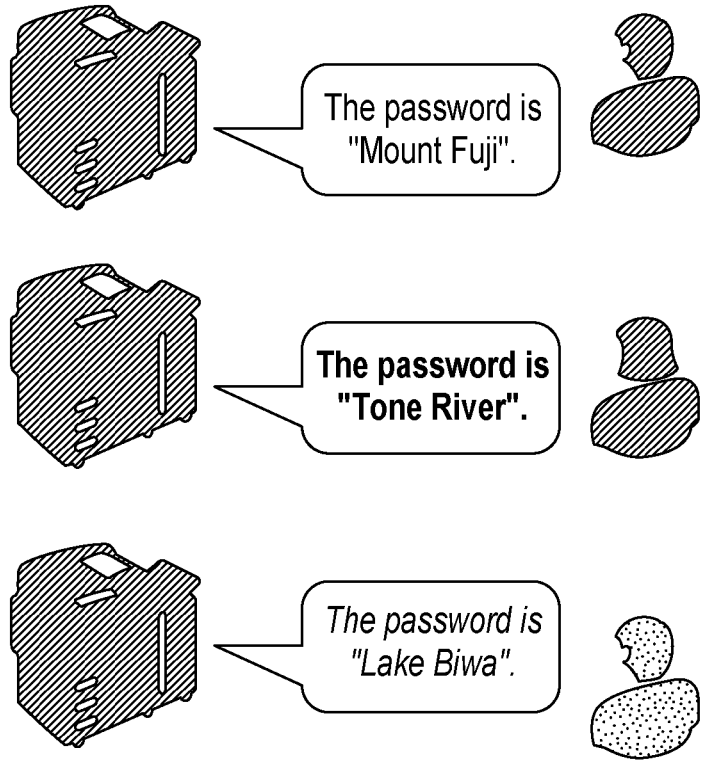
FIG. 11
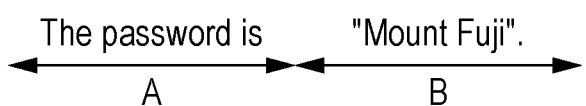
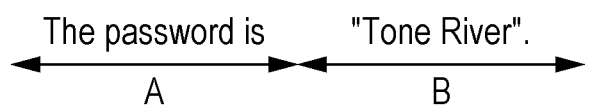
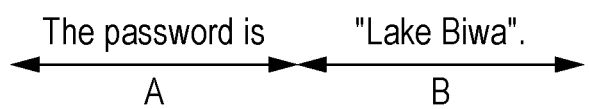

INFORMATION PROCESSING APPARATUS AND NON-TRANSITORY COMPUTER READABLE STORAGE MEDIUM USING OUTPUT SOUNDS REPRESENTING PASSWORDS

CROSS-REFERENCE TO RELATED APPLICATIONS

This application is based on and claims priority under 35 USC 119 from Japanese Patent Application No. 2019-153051 filed Aug. 23, 2019.

BACKGROUND

(i) Technical Field

The present disclosure relates to an information processing apparatus and a non-transitory computer readable medium.

(ii) Related Art

Japanese Unexamined Patent Application Publication No. 2014-180792 describes an image forming apparatus that performs control so that a printing unit prints received image data if authentication information displayed on a UI device and obtained information obtained from a mobile terminal device that is present within a predetermined range satisfy a predetermined relationship, after a print instruction for printing a print target is performed by using a mobile terminal device.

SUMMARY

With a configuration that enables an image forming instruction be issued by specifying an image forming apparatus near the mobile terminal device, in a case where plural image forming apparatuses are present within a distance smaller than the position detection precision of the mobile terminal device, it may not be possible to specify an image forming apparatus to be used by a user. Therefore, in such a case, authentication information is displayed. However, if each of the image forming apparatuses does not have a display, it is not possible to specify an image forming apparatus to be used by the user.

Aspects of non-limiting embodiments of the present disclosure relate to providing an information processing apparatus and a non-transitory computer readable medium each of which enables an image forming instruction to be performed by specifying an image forming apparatus to be used by a user, even with a configuration such that plural image forming apparatuses are present within a distance that is smaller than the position detection precision of the mobile terminal device and such that each of the image forming apparatuses does not have a display.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor. The processor is configured to: accept, from a mobile terminal device carried by a user, identification information that enables identification of the user, positional information of the mobile terminal device, and an image forming instruction; generate sound authentication information for authenticating the accepted image forming instruction and cause an image forming apparatus that is present within a predetermined range of the accepted positional information to output a sound representing the sound authentication information; and cause the image forming apparatus to perform an image forming operation if the sound authentication information and authentication information that is input by using the mobile terminal device satisfy a predetermined relationship.

BRIEF DESCRIPTION OF THE DRAWINGS

An exemplary embodiment of the present disclosure will be described in detail based on the following figures, wherein:

FIG. 10 is a schematic view illustrating a state in which image forming apparatuses are outputting sounds in different tones;

FIG. 11 illustrates an example in which image forming apparatuses output sounds at different timings;

DETAILED DESCRIPTION

Figure 1:
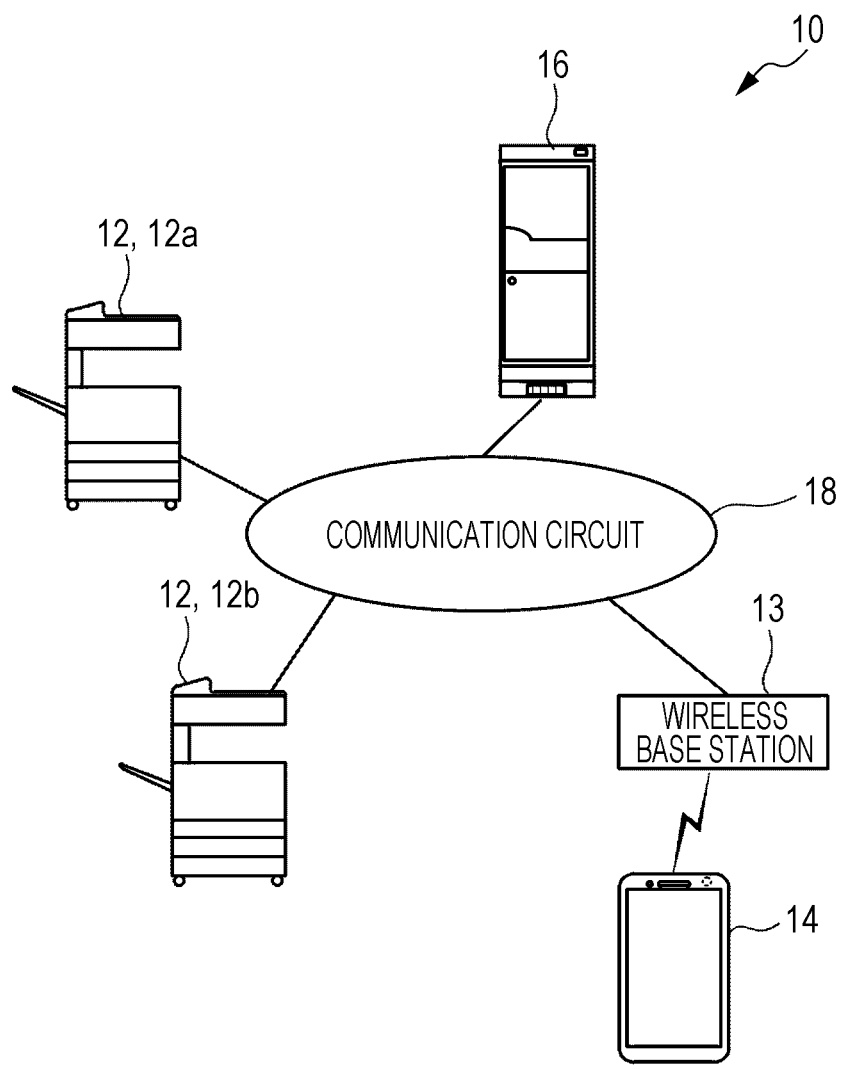
FIG. 1 is a schematic diagram of an information processing system according to the present exemplary embodiment.

Hereafter, an exemplary embodiment will be described in detail with reference to the drawings. In the present exemplary embodiment, an information processing system in which plural image forming apparatuses, a print server, and a wireless base station are connected to each other via a communication circuit such as a network will be described as an example. FIG. 1 is a schematic diagram of an information processing system 10 according to the present exemplary embodiment.

As illustrated in FIG. 1, the information processing system 10 according to the present exemplary embodiment includes plural image forming apparatuses 12a, 12b, . . . ; a wireless base station 13; and a print server 16. When it is not necessary to discriminate between the image forming apparatuses 12a, 12b, . . . , the characters at the end of the reference numerals may be omitted. In the present exemplary embodiment, an example in which the information processing system 10 includes the plural image forming apparatuses 12a, 12b, . . . will be described. However, the information processing system 10 may include only one image forming apparatus 12.

The image forming apparatuses 12, the wireless base station 13, and the print server 16 are connected to each other via a communication circuit 18, such as a local area network (LAN), a wide area network (WAN), the Internet, or an intranet. The image forming apparatuses 12, the wireless base station 13, and the print server 16 each can perform transmission/reception of various data therebetween via the communication circuit 18. A mobile terminal device 14 is wirelessly connected to the wireless base station 13, so that the mobile terminal device 14 can perform transmission/reception of various data with other apparatuses and the like.

In the information processing system 10 according to the present exemplary embodiment, the print server 16 provides a cloud service in accordance with a request from the mobile terminal device 14, which is registered beforehand. To be specific, the print server 16 provides a cloud service as follows: a print instruction is issued from the mobile terminal device 14 to the print server 16 by using an application; and one of the image forming apparatuses 12 that is present within a predetermined range from the mobile terminal device 14 performs an image forming operation corresponding to the print instruction.

Figure 2:
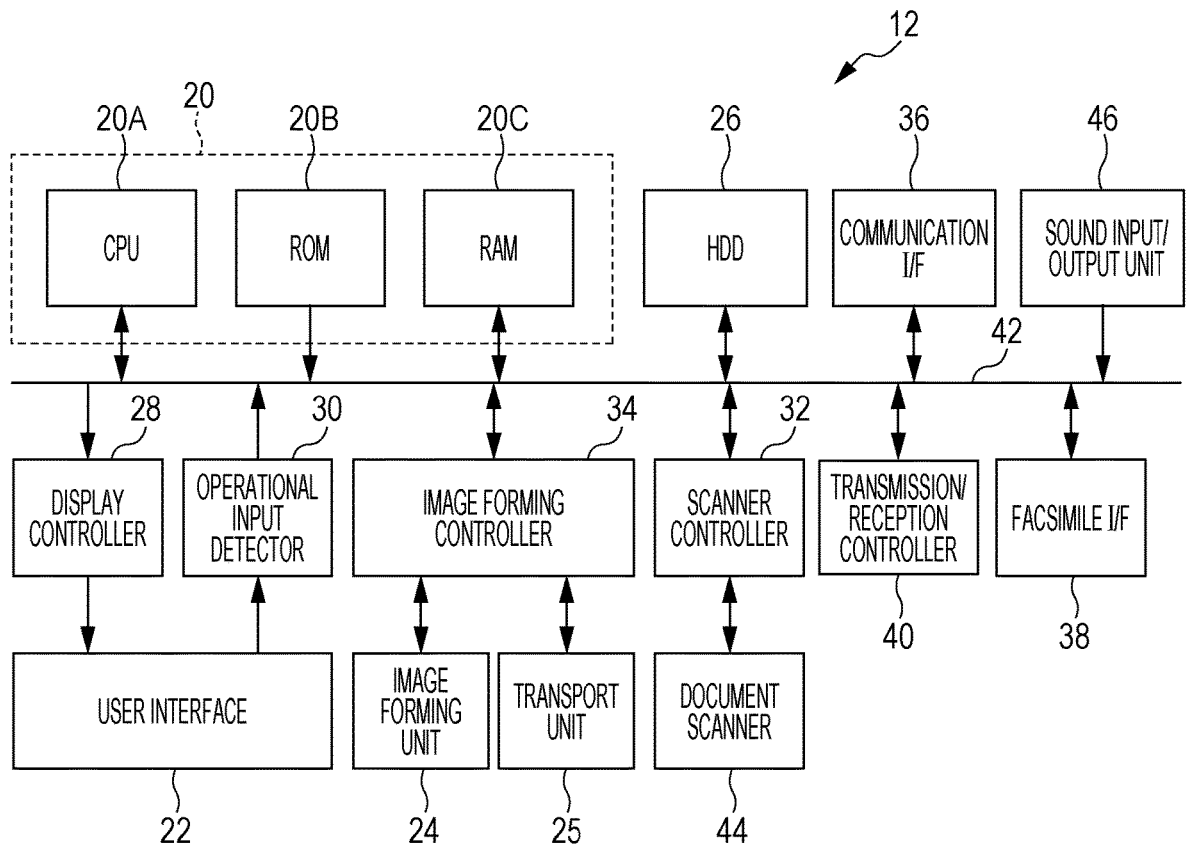
FIG. 2 is a block diagram of an electrical configuration of an image forming apparatus of the information processing system according to the present exemplary embodiment.

FIG. 2 is a block diagram of an electrical configuration of the image forming apparatus 12 of the information processing system 10 according to the present exemplary embodiment.

As illustrated in FIG. 2, the image forming apparatus 12 according to the present exemplary embodiment includes a control unit 20 including a central processing unit (CPU) 20A as an example of a processor, a read only memory (ROM) 20B, and a random access memory (RAM) 20C. The CPU 20A controls the overall operation of the image forming apparatus 12. The RAM 20C is used as a work area when the CPU 20A executes various programs. The ROM 20B stores various control programs and various parameters beforehand. In the image forming apparatus 12, the elements of the control unit 20 are electrically connected to each other via a system bus 42.

The image forming apparatus 12 according to the present exemplary embodiment includes a hard disk drive (HDD) 26 that stores various data, such as user information, setting parameters, and malfunction information; application programs; and the like. The image forming apparatus 12 includes a display controller 28 that is connected to a user interface 22 and that controls displaying of various operation screens and the like on a display of the user interface 22. The image forming apparatus 12 includes an operational input detector 30 that is connected to the user interface 22 and that detects an operation instruction input via the user interface 22. In the image forming apparatus 12, the HDD 26, the display controller 28, and the operational input detector 30 are electrically connected to each other via the system bus 42. In the image forming apparatus 12 according to the present exemplary embodiment, the HDD 26 is used as a storage. However, the storage is not limited to a HDD. A non-volatile memory, such as a flash memory, may be used as the storage.

The image forming apparatus 12 according to the present exemplary embodiment includes a scanner controller 32 that controls optical scanning of an image by a document scanner 44 and feeding of a document by a document transport unit, and an image forming controller 34 that controls forming of an image by an image forming unit 24 and transporting of a sheet to the image forming unit 24 by a transport unit 25. The image forming apparatus 12 includes a communication circuit interface (I/F) 36 that is connected to the communication circuit 18 and that performs transmission/reception of communication data with an external device, such as the print server 16, connected to the communication circuit 18. The image forming apparatus 12 includes a facsimile interface (I/F) 38 that is connected to a telephone line (not shown) and that performs transmission/reception of facsimile data with a facsimile apparatus connected to the telephone line. The image forming apparatus 12 includes a transmission/reception controller 40 that controls transmission/reception of facsimile data via the facsimile I/F 38. The image forming apparatus 12 includes a sound input/output unit 46 that performs input/output of a sound. In the image forming apparatus 12, the transmission/reception controller 40, the scanner controller 32, the image forming controller 34, the communication circuit I/F 36, the facsimile I/F 38, and the sound input/output unit 46 are electrically connected to the system bus 42. The user interface 22 may be omitted, because the image forming apparatus 12 includes the sound input/output unit 46.

In the image forming apparatus 12 according to the present exemplary embodiment, which is configured as described above, the CPU 20A accesses each of the RAM 20C, the ROM 20B, and the HDD 26. In the image forming apparatus 12, the CPU 20A controls, via the display controller 28, displaying of operation screens on a display 22A of the user interface 22 and displaying of information such as various messages. In the image forming apparatus 12, the CPU 20A controls the operations of the document scanner 44 and the document transport unit via the scanner controller 32. In the image forming apparatus 12, the CPU 20A controls operations of the image forming unit 24 and the transport unit 25 via the image forming controller 34, and controls transmission/reception of communication data via the communication circuit I/F 36. In the image forming apparatus 12, the CPU 20A controls transmission/reception of facsimile data by the transmission/reception controller 40 via the facsimile I/F 38. In the image forming apparatus 12, the CPU 20A recognizes the contents of an operation performed on the user interface 22 based on operation information detected by the operational input detector 30, and performs various control operations based on the contents of the operation.

Figure 3:
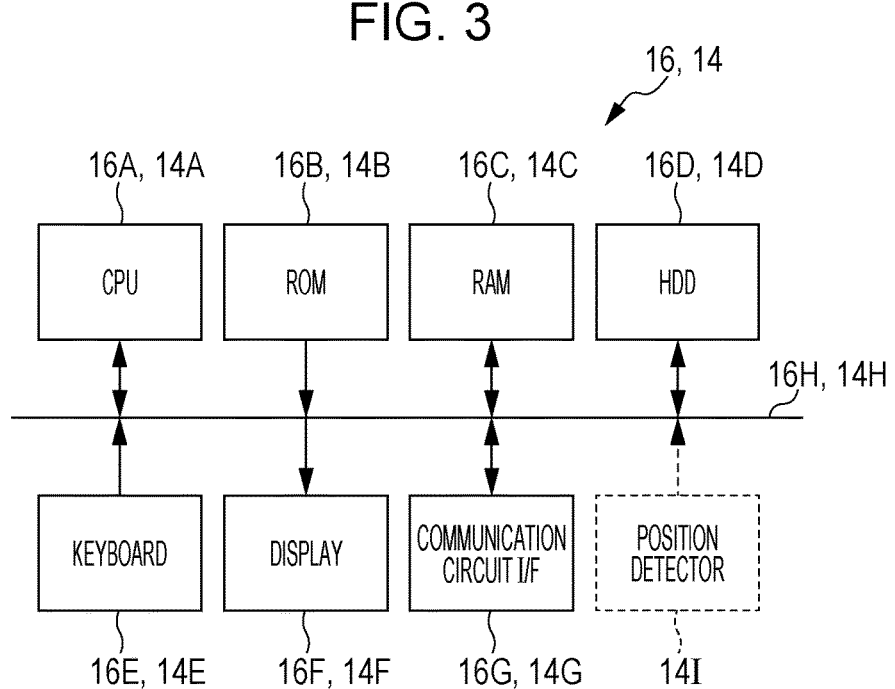
FIG. 3 is a block diagram of an electrical configuration of a print server of the information processing system according to the present exemplary embodiment.

Next, a configuration of an electrical system of the print server 16 according to the present exemplary embodiment will be described. FIG. 3 is a block diagram of the electrical configuration of the print server 16 of the information processing system 10 according to the present exemplary embodiment.

As illustrated in FIG. 3, the print server 16 according to the present exemplary embodiment includes a CPU 16A as an example of a processor, a ROM 16B, a RAM 16C, a HDD 16D, a keyboard 16E, a display 16F, and a communication circuit interface (I/F) 16G. The CPU 16A controls the overall operation of the print server 16. The ROM 16B stores various control programs, various parameters, and the like beforehand. The RAM 16C is used as a work area when the CPU 16A executes various programs. The HDD 16D stores various data, application programs, and the like. The keyboard 16E is used to input various information items. The display 16F is used to display various information items. The communication circuit I/F 16G is connected to the communication circuit 18, and performs transmission/reception of various data with other devices connected to the communication circuit 18. The elements of the print server 16 are electrically connected to each other via a system bus 16H. In the print server 16 according to the present exemplary embodiment, the HDD 16D is used as a storage. However, the storage is not limited to a HDD. A non-volatile memory, such as a flash memory, may be used as the storage.

In the print server 16 according to the present exemplary embodiment, which is configured as described above, the CPU 16A accesses each of the ROM 16B, the RAM 16C, and the HDD 16D; obtains various data via the keyboard 16E; and displays various information items on the display 16F. In the print server 16, the CPU 16A controls transmission/reception of communication data via the communication circuit I/F 16G.

The mobile terminal device 14 includes a CPU 14A as an example of a processor, a ROM 14B, a RAM 14C, and the like. The mobile terminal device 14 is configured basically similar to the print server 16, except that the mobile terminal device 14 includes a position detector 14I shown by a dotted line in FIG. 3. Therefore, detailed descriptions of elements other than the position detector 14I will be omitted.

The position detector 14I detects the current position of the mobile terminal device 14. For example, the position detector 14I receives an electromagnetic wave signal from a global positioning system (GPS) satellite, which includes data of a time measured by an atomic clock of the satellite and information on the orbit of the satellite, and calculates the distance from the satellite on the basis of the difference between the time of transmission and the time of reception of the electromagnetic wave signal. By identifying a point in a space by measuring the distances from three or more GPS satellites, the position detector 14I detects the position of the mobile terminal device 14.

Next, processes performed by the information processing system 10 according to the present exemplary embodiment, which is configured as described above, will be described in detail.

Figure 4:
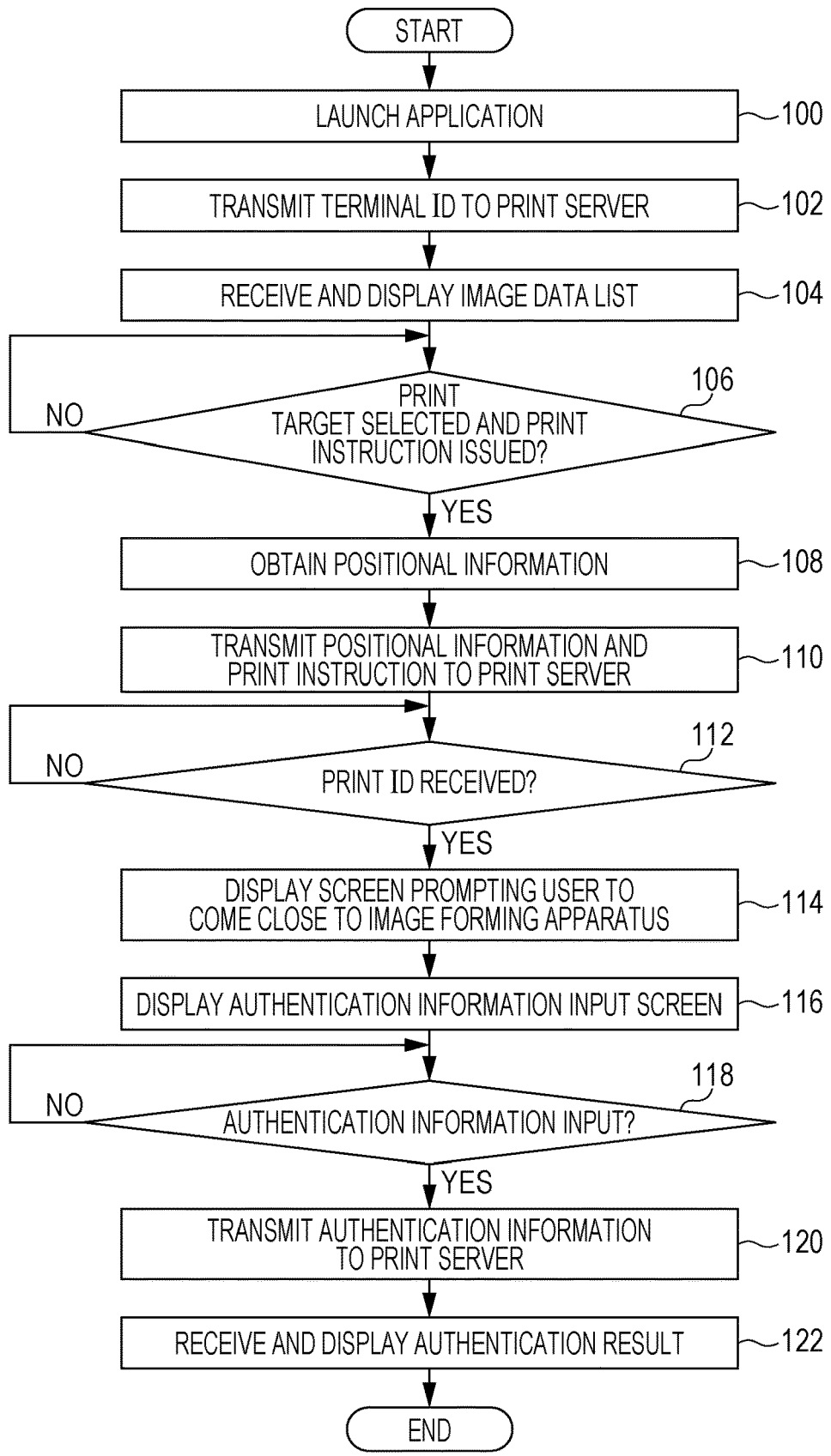
FIG. 4 is a flowchart illustrating an example of a process performed by a mobile terminal device of the information processing system according to the present exemplary embodiment.

First, a process performed by the mobile terminal device 14 will be described. FIG. 4 is a flowchart illustrating an example of the process performed by the mobile terminal device 14 of the information processing system 10 according to the present exemplary embodiment. The process illustrated in FIG. 4 starts when a user instructs the mobile terminal device 14 to launch a print application installed beforehand in the mobile terminal device 14.

In step 100, the CPU 14A launches the application, and the process proceeds to step 102.

In step 102, the CPU 14A transmits a terminal ID that identifies the mobile terminal device 14 to the print server 16, and the process proceeds to step 104.

In step 104, the CPU 14A receives an image data list from the print server 16 and displays the image data list, and the process proceeds to step 106. That is, the CPU 14A obtains a list of image data, which is registered beforehand in the print server 16, from the print server 16, and displays the obtained list of image data on a list screen.

In step 106, the CPU 14A determines whether a print target has been selected and a print instruction has been issued. The determination performed here is determination as to whether image data of a print target has been selected from the image data displayed on the list screen and a print instruction has been issued. The process waits until the determination becomes affirmative, and the process proceeds to step 108.

In step 108, the CPU 14A obtains positional information detected by the position detector 14I, and the process proceeds to step 110.

In step 110, the CPU 14A transmits the positional information and a print instruction to the print server 16 via a communication circuit I/F 14G, and the process proceeds to step 112.

In step 112, the CPU 14A determines whether a print ID has been received from the print server 16. The process waits until the determination becomes affirmative, and the process proceeds to step 114.

In step 114, the CPU 14A displays a screen that prompts a user to come close to the image forming apparatus 12 on a display 14F of the mobile terminal device 14, and the process proceeds to step 116.

In step 116, the CPU 14A displays an authentication information input screen, and the process proceeds to step 118. The authentication information input screen is a screen for inputting authentication information for performing printing. As the authentication information, sound authentication information to be output as a sound from the image forming apparatus 12 is input. The authentication information input screen may be displayed at the same time as the screen displayed in step 114, which prompts a user to come close to the image forming apparatus 12.

In step 118, the CPU 14A determines whether authentication information has been input. The determination performed here is determination as to whether authentication information that corresponds to sound authentication information has been input as a sound input or an operational input. The process waits until the determination becomes affirmative, and the process proceeds to step 120.

In step 120, the CPU 14A transmits the input authentication information to the print server 16 via the communication circuit I/F 14G, and the process proceeds to step 122.

In step 122, the CPU 14A receives an authentication result from the print server 16, displays the authentication result on the display 14F, and finishes the process.

Figure 5:
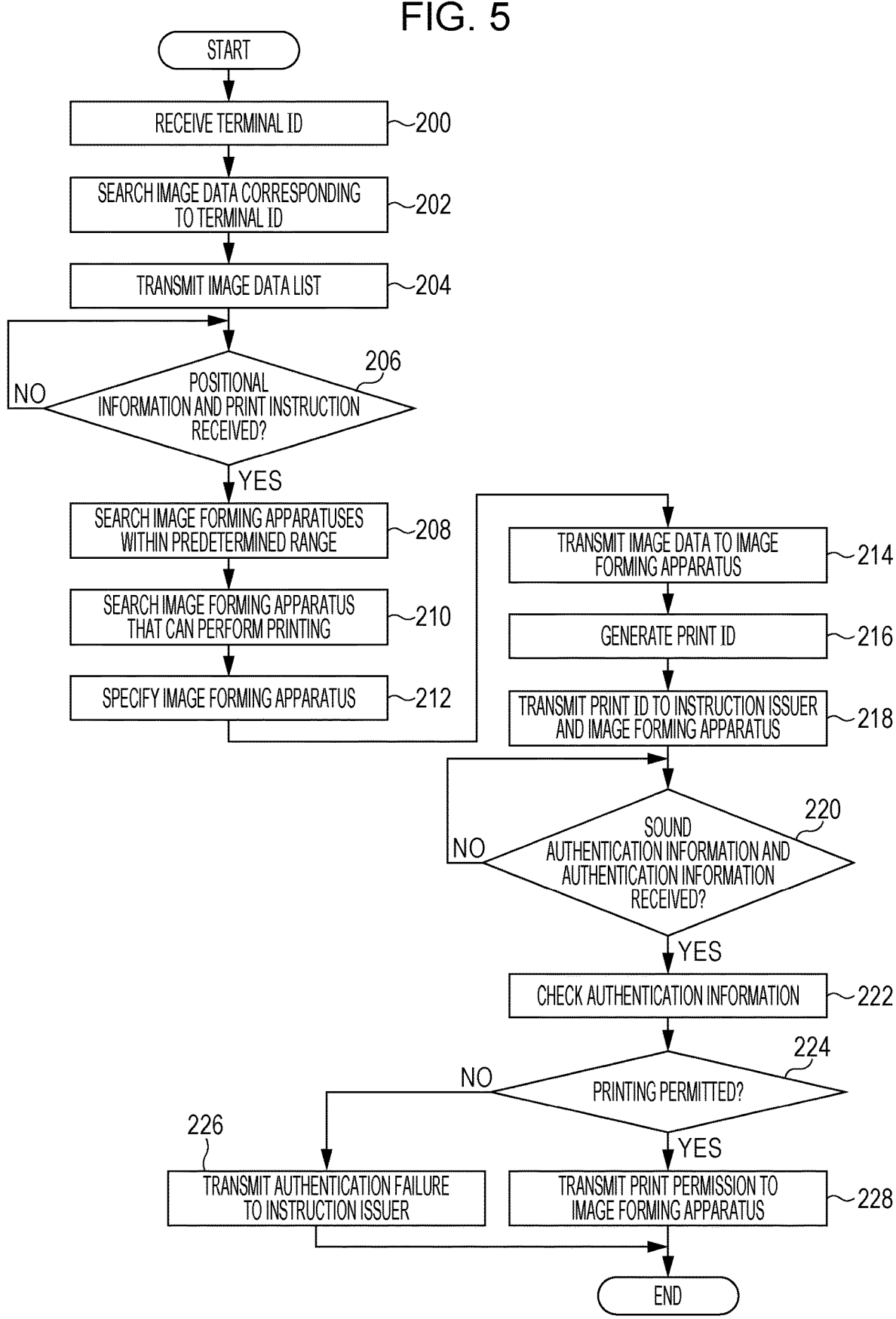
FIG. 5 is a flowchart illustrating an example of a process performed by the print server of the information processing system according to the present exemplary embodiment.

Next, a process performed by the print server 16 will be described. FIG. 5 is a flowchart illustrating an example of the process performed by the print server 16 of the information processing system 10 according to the present exemplary embodiment. The process illustrated in FIG. 5 starts when a terminal ID is transmitted from the mobile terminal device 14.

In step 200, the CPU 16A receives the terminal ID transmitted from the mobile terminal device 14, and the process proceeds to step 202.

In step 202, the CPU 16A searches image data corresponding to the terminal ID, and the process proceeds to step 204. For example, the CPU 16A searches image data registered beforehand by a user who has been registered beforehand so as to correspond to the terminal ID.

In step 204, the CPU 16A transmits an image data list to the mobile terminal device 14 via the communication circuit I/F 16G, and the process proceeds to step 206.

In step 206, the CPU 16A determines whether positional information and a print instruction have been received. The process waits until the determination becomes affirmative, and the process proceeds to step 208.

In step 208, the CPU 16A searches image forming apparatuses 12 within a predetermined range from the received positional information, and the process proceeds to step 210.

In step 210, the CPU 16A searches an image forming apparatus 12 that can perform printing, and the process proceeds to step 212. For example, the CPU 16A searches, among the image forming apparatuses 12 within the predetermined range searched in step 208, an image forming apparatus 12 that can perform printing in accordance with the print instruction.

In step 212, the CPU 16A specifies the image forming apparatus 12, and the process proceeds to step 214.

In step 214, the CPU 16A transmits image data to the specified image forming apparatus 12 via the communication circuit I/F 16G, and the process proceeds to step 216. If plural image forming apparatuses 12 are specified, image data may be transmitted to the plural image forming apparatuses 12. In this case, the CPU 16A may prompt a user to select one of the image forming apparatuses 12 by using an operational input function or a sound input function of the mobile terminal device 14 or the image forming apparatus 12.

In step 216, the CPU 16A generates a print ID, and the process proceeds to step 218. The print ID is generated so as to be associated with a user.

In step 218, the CPU 16A transmits the print ID to the mobile terminal device 14 that has issued the print instruction and the image forming apparatus 12 to which the image data has been transmitted, via the communication circuit I/F 16G, and the process proceeds to step 220.

In step 220, the CPU 16A determines whether sound authentication information and authentication information have been received. The determination performed here is determination as to whether sound authentication information has been received from the image forming apparatus 12 and authentication information has been received from the mobile terminal device 14. The process waits until the determination becomes affirmative, and the process proceeds to step 222.

In step 222, the CPU 16A checks the sound authentication information received from the image forming apparatus 12 against the authentication information received from the mobile terminal device 14, and the process proceeds to step 224.

In step 224, the CPU 16A determines whether printing has been permitted. The determination is affirmative when the result of checking the sound authentication information against the authentication information satisfies a predetermined condition and authentication succeeds, and the determination is negative when the authentication fails. If the determination is negative, the process proceeds to step 226. If the determination is affirmative, the process proceeds to step 228.

In step 226, the CPU 16A transmits an authentication failure to the mobile terminal device 14 via the communication circuit I/F 16G, and finishes the process.

In step 228, the CPU 16A transmits a print permission to the image forming apparatus 12 via the communication circuit I/F 16G, and finishes the process.

Figure 6:
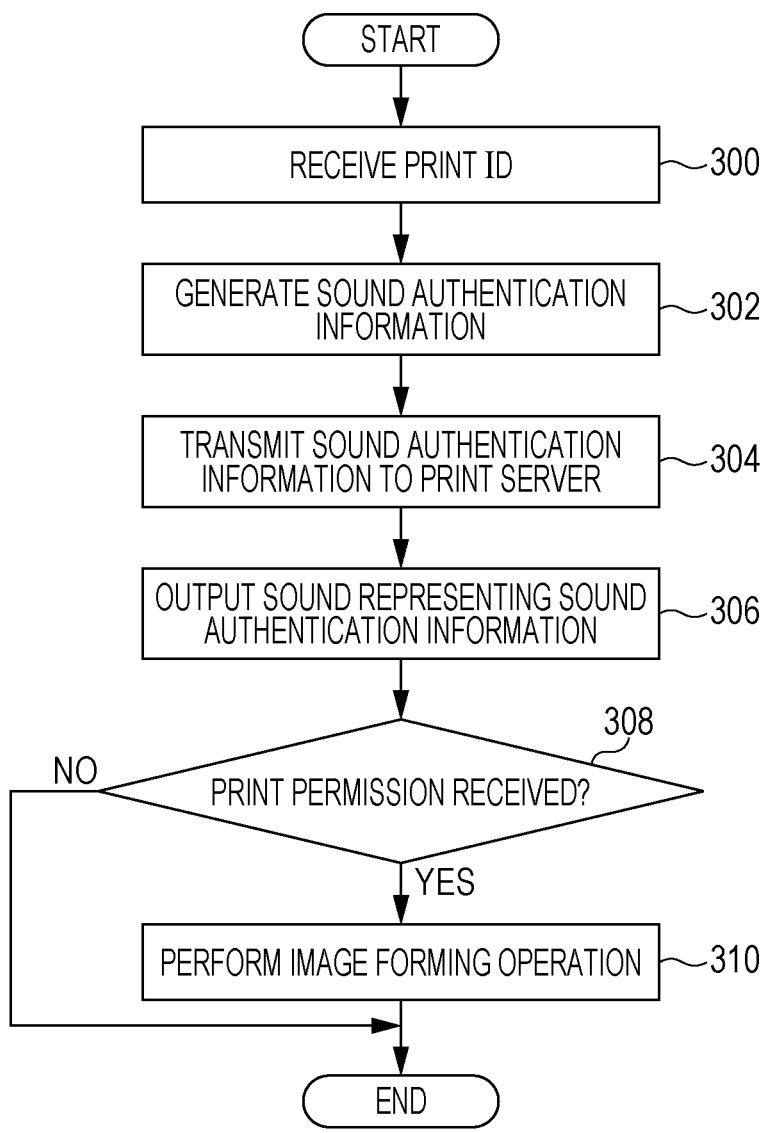
FIG. 6 is a flowchart illustrating an example of a process performed by the image forming apparatus of the information processing system according to the present exemplary embodiment.

Next, a process performed by the image forming apparatus 12 will be described. FIG. 6 is a flowchart illustrating an example of the process performed by the image forming apparatus 12 of the information processing system 10 according to the present exemplary embodiment. The process illustrated in FIG. 6 starts when a print ID is transmitted from the print server 16.

In step 300, the CPU 20A receives the print ID from the print server 16, and the process proceeds to step 302.

In step 302, the CPU 20A generates sound authentication information, and the process proceeds to step 304. The sound authentication information generated here is sound authentication information for permitting printing in accordance with a print instruction corresponding to the print ID.

In step 304, the CPU 20A transmits the generated sound authentication information to the print server 16 via the communication circuit I/F 36, and the process proceeds to step 306. By using the sound authentication information, checking of authentication information is performed in the aforementioned steps 220 to 222.

In step 306, the CPU 20A causes the sound input/output unit 46 to output a sound representing the sound authentication information, and the process proceeds to step 308.

In step 308, the CPU 20A determines whether a print permission has been received. The determination is affirmative if print permission has been transmitted in the aforementioned step 228, and the process proceeds to step 310. The determination is negative if an authentication failure has been transmitted in the aforementioned step 226, and the process finishes without performing printing. If an authentication failure is transmitted from the print server 16 and the image forming apparatus 12 receives the authentication failure, the sound input/output unit 46 may output a sound indicating the authentication failure. Alternatively, the authentication failure may be displayed on the user interface 22, or both of outputting of the sound and displaying of the authentication failure may be performed.

In step 310, the CPU 20A performs an image forming operation corresponding to the print instruction and finishes the process.

Figure 7:
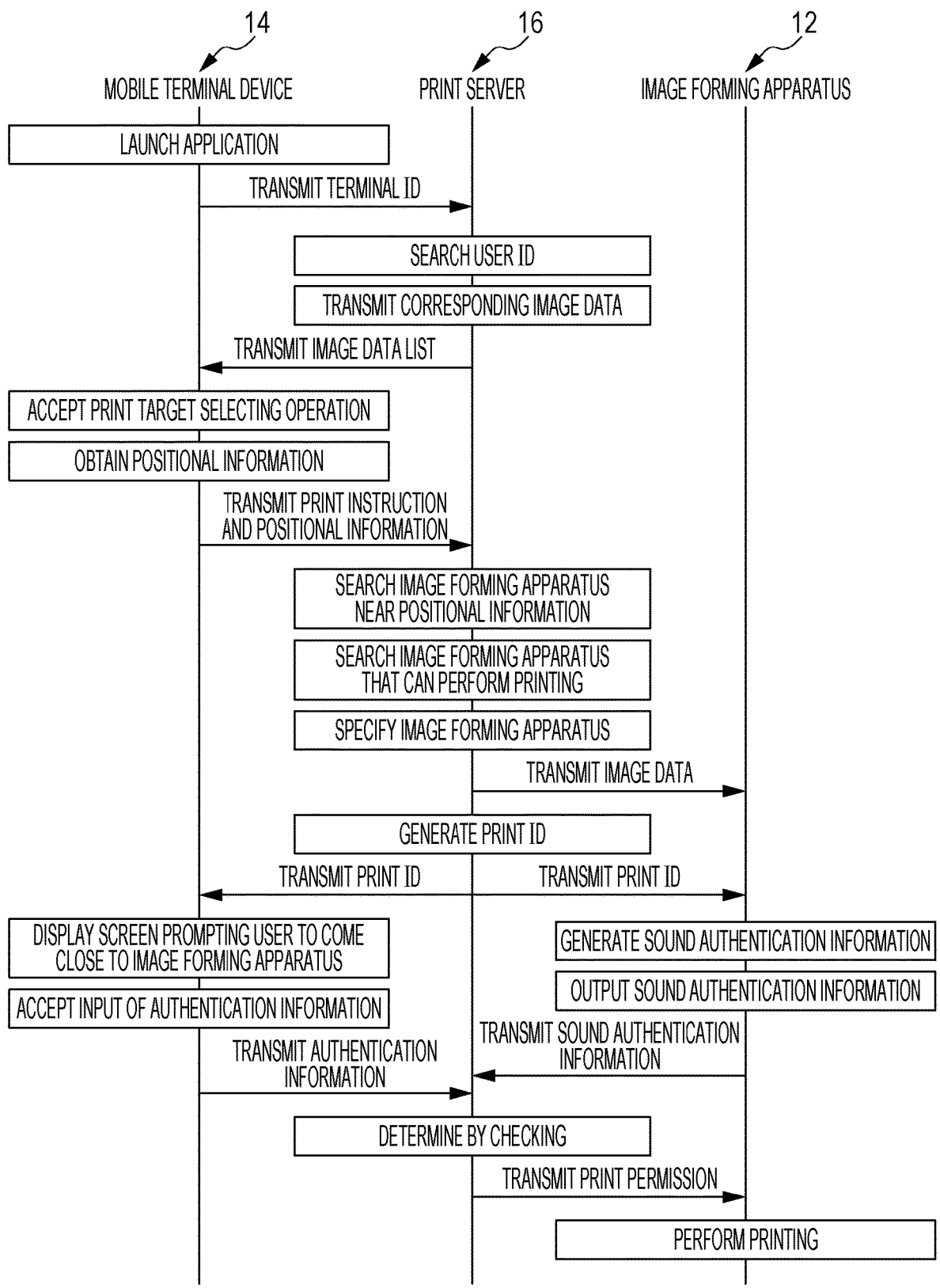
FIG. 7 is a sequence diagram illustrating interactions between the processes performed by the mobile terminal device, the print server, and the image forming apparatus of the information processing system according to the present exemplary embodiment.

Here, the overall process performed by the information processing system 10 according to the present exemplary embodiment will be described. FIG. 7 is a sequence diagram illustrating interactions between the processes performed by the mobile terminal device 14, the print server 16, and the image forming apparatus 12 of the information processing system 10 according to the present exemplary embodiment.

First, in the mobile terminal device 14, when an application is launched, in the aforementioned step 102, a terminal ID is transmitted from the mobile terminal device 14 to the print server 16.

In the print server 16, in the aforementioned step 202, the user ID is searched from the terminal ID, and corresponding image data is searched. Then, a list of corresponding image data is transmitted to the mobile terminal device 14.

In the mobile terminal device 14, when the image data list is received from the print server 16, an operation of selecting a print target is accepted. That is, the image data list is displayed in the aforementioned step 104, and, when an operation of selecting image data of a print target is performed and a print instruction is accepted, the determination in the aforementioned step 106 becomes affirmative.

Next, in the mobile terminal device 14, positional information is obtained in the aforementioned step 108. Then, in the aforementioned step 110, the positional information and the print instruction are transmitted to the print server 16.

In the print server 16, when the positional information and the print instruction are received, in the aforementioned steps 208 to 212, image forming apparatuses 12 within a predetermined range from the positional information are searched. Then, an image forming apparatus 12 that can perform printing is searched, and the image forming apparatus 12 is specified. When the image forming apparatus 12 is specified, image data corresponding to the print instruction is specified and transmitted to the image forming apparatus 12. The print server 16 generates a print ID corresponding to the print instruction in association with a user, and transmits the print ID to the mobile terminal device 14 and the specified image forming apparatus 12.

In the mobile terminal device 14, when the print ID is received from the print server 16, in the aforementioned step 114, a screen that prompts a user to come close to the image forming apparatus 12 is displayed.

In the image forming apparatus 12, when the image data and the print ID are received from the print server 16, in the aforementioned step 302, sound authentication information for permitting printing of a print instruction corresponding to the print ID is generated. Then, in the aforementioned steps 304 to 306, the sound authentication information is output as a sound by the sound input/output unit 46, and the sound authentication information is transmitted to the print server 16. The authentication information may be output as a sound at a timing when, for example, a user operates the mobile terminal device 14 to perform an instruction for outputting the sound. Alternatively, the image forming apparatus 12 may output a sound when the mobile terminal device 14 corresponding to the terminal ID is detected within a predetermined range from the target image forming apparatus 12. Alternatively, the image forming apparatus 12 may include a human sensor and may output a sound when the human sensor detects approach of a human.

After the sound authentication information is output as a sound from the image forming apparatus 12, in the mobile terminal device 14, input of authentication information corresponding to the sound authentication information, which has been output as a sound from the image forming apparatus 12, is accepted, and the accepted authentication information is transmitted to the print server 16. Alternatively, input of the authentication information may be accepted, for example, by the mobile terminal device 14 when an operation of inputting authentication information corresponding to the sound authentication information is performed. Alternatively, the sound authentication information, which is output as a sound from the image forming apparatus 12, may be accepted by being input via a microphone or the like of the mobile terminal device 14. Alternatively, a user may input authentication information corresponding to the sound authentication information by his/her voice to the mobile terminal device 14. In the present exemplary embodiment, an example in which the mobile terminal device 14 accepts input of authentication information corresponding to the sound authentication information will be described. However, the image forming apparatus 12 may accept input of the authentication information.

In the print server 16, when the sound authentication information is received from the image forming apparatus 12 and the authentication information is received from the mobile terminal device 14, in the aforementioned step 222, whether authentication succeeds or fails is determined. If the authentication succeeds, in the aforementioned step 228, a print permission is transmitted from the print server 16, and the image forming apparatus 12 performs printing.

Because the processes are performed as described above, even when plural image forming apparatuses are present within a distance smaller than the position detection precision of the mobile terminal device 14 and the image forming apparatuses do not have displays, an image forming apparatus to be used by a user is specified by outputting a sound, and an image forming instruction is performed.

Figure 8:
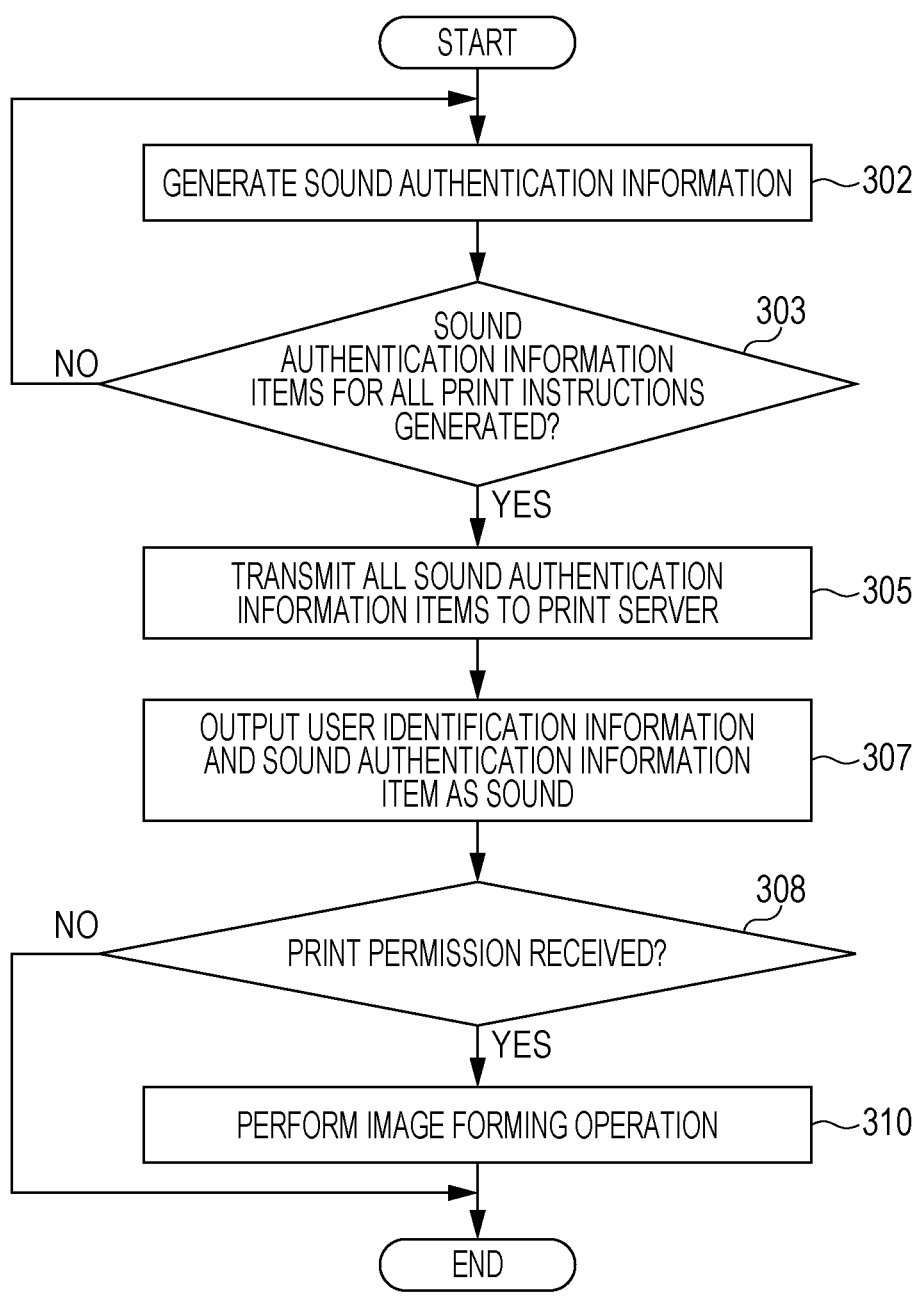
FIG. 8 is a flowchart illustrating an example of a process performed by the image forming apparatus in a case where plural print instructions are issued from mobile terminal devices of plural users.

Next, a case where plural print instructions are issued from mobile terminal devices 14 of plural users will be described. FIG. 8 is a flowchart illustrating an example of a process performed by the image forming apparatus 12 if plural print instructions are issued from the mobile terminal devices 14 of plural users. The process illustrated in FIG. 8 is performed when plural print IDs are received in the aforementioned step 300.

When plural print IDs are received, the process proceeds to step 302, the CPU 20A generates sound authentication information including plural sound authentication information items, and the process proceeds to step 303. The sound authentication information items generated here are sound authentication information items for permitting printing of print instructions corresponding to the print IDs.

In step 303, the CPU 20A determines whether sound authentication information items for all print instructions have been generated. If the determination is negative, the process returns to step 302, and the step is repeated until sound authentication information items for all print instructions are generated. If the determination is affirmative, the process proceeds to step 305.

In step 305, the CPU 20A transmits all sound authentication information items to the print server 16, and the process proceeds to step 307.

In step 307, the CPU 20A causes the sound input/output unit 46 to sequentially output information for identifying a user and a sound authentication information item as a sound, and the process proceeds to the aforementioned step 308. For example, a sound "Jennifer, please say or input a password 'Mount Fuji' to the mobile terminal device 14." is output. Alternatively, if plural users are present, plural sounds may be output at once. In this case, for example, sounds "Jennifer's password is 'Mount Fuji'.", "Anne's password is 'Lake Biwa'.", and "Sue's password is 'Tone River'." are output. Alternatively, in addition to the authentication information, a print instruction name (such as a file name) may be output as a sound. In this case, for example, a sound "The password for printing 20YYMMDD_hotel.pdf is 'Mount Fuji'." is output. In a case where plural users are present, for example, sounds "There are print instructions from plural users.", "The password for 20YYMMDD_hotel.pdf is 'Mount Fuji'.", "The password for Golf_Competition_Parties_List.xdw is 'Lake Biwa'.", and "The password for New_Year's_Greeting.doc's is 'Tone River'." are output.

Figure 9:
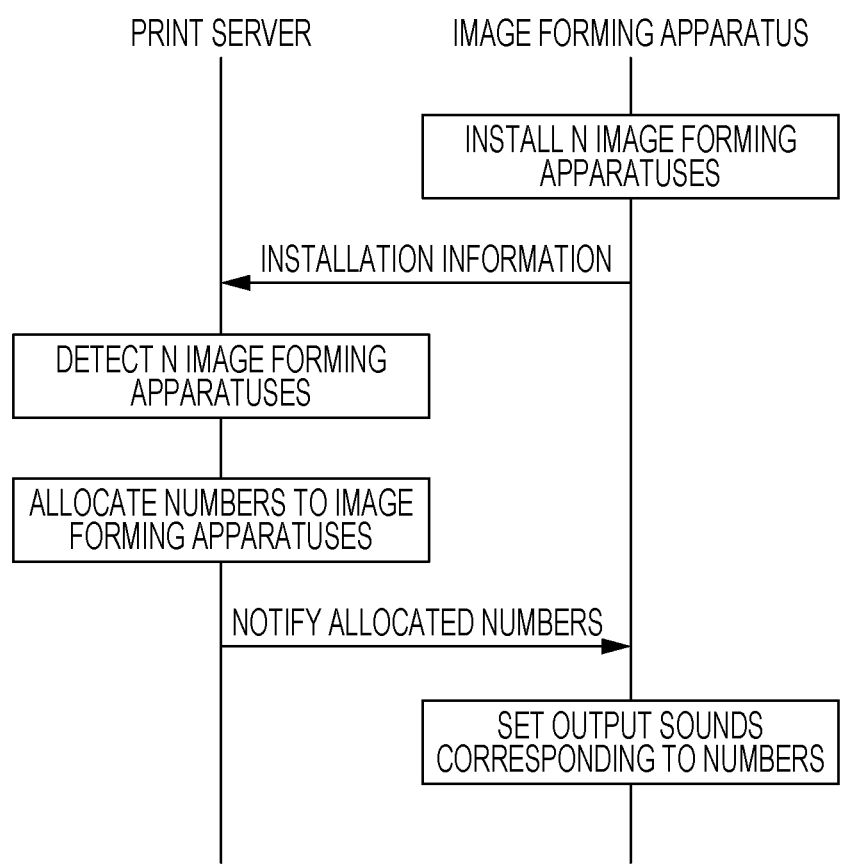
FIG. 9 is a sequence diagram illustrating interactions between processes that are performed in a case where plural image forming apparatuses are installed at adjacent positions and the image forming apparatuses output sounds in different tones.

In a case of installing plural image forming apparatuses 12 at adjacent positions, the image forming apparatuses 12 may output sounds in different tones. For example, as illustrated in FIG. 9, when N image forming apparatuses 12 are installed, the installation information is notified to the print server 16. The print server 16 recognizes from the installation information that N image forming apparatuses 12 are installed at adjacent positions, and allocates numbers to the image forming apparatuses 12. The print server 16 notifies the allocated numbers to the image forming apparatuses 12. Then, the image forming apparatuses 12 set output sounds in different tones corresponding the numbers. Thus, different output sounds corresponding to the image forming apparatuses 12 are output. FIG. 10 illustrates an example in which the image forming apparatuses 12 are outputting sounds in different tones.

In the case of setting plural image forming apparatuses 12 at adjacent positions, instead of outputting different sounds, the image forming apparatuses 12 may output sounds at different timings. For example, as illustrated in FIG. 11, an image forming apparatus 12 that first received a print ID first outputs a sound, and, when the sound has been output up to a predetermined part, an image forming apparatus 12 that second received a print ID outputs a sound. In the example illustrated in FIG. 11, the first image forming apparatus 12 outputs a sound "The password is 'Mount Fuji'.", and the second image forming apparatus 12 outputs a sound "The password is 'Tone River'.". When the first image forming apparatus 12 has output "The password is", the second image forming apparatus 12 starts outputting "The password is", and the first image forming apparatus 12 outputs "Mount Fuji" and the second image forming apparatus 12 outputs "The password is" at the same time. Different output sounds may be output at different timings.

The output sounds may be output at different timings by using another method. For example, an output sound may be divided into several portions. An image forming apparatus 12 refrains from outputting a portion of the sound when another image forming apparatus 12 is outputting the same portion, and starts or restarts outputting the portion when the other image forming apparatus 12 has finished outputting the portion.

In the exemplary embodiment described above, if a user fails to hear a sound that is output as sound authentication information, it is necessary to output the sound again. However, it is redundant to repeat the sound "The password is 'Mount Fuji.'" all over again in the same way as at the first time. Therefore, the sound to be output again may be changed in accordance with a sound or an input operation input by a user to the mobile terminal device 14 or to the image forming apparatus 12.

For example, a first example is a case where the image forming apparatus 12 outputs a sound "The password is 'Mount Fuji'." and a user, who has failed to hear this, wants to hear only the password. In this case, the user inputs "What is the password?" to the image forming apparatus 12 or the mobile terminal device 14. Then, the image forming apparatus 12 picks up preset words and determines to output only the password again. In the present example, the image forming apparatus 12 outputs again a sound of only the password "Mount Fuji".

A second example is a case where a specific user wants to hear only a print instruction for the user as follows: first, the image forming apparatus 12 outputs sounds "Jennifer's password is 'Mount Fuji'." and "Anne's password is 'Tone River'."; and, if the user wants to hear only the Jennifer's password, the user inputs "I am Jennifer." to the image forming apparatus 12 or the mobile terminal device 14. The image forming apparatus 12 picks up preset words and determines to output only the password again. In the present example, the image forming apparatus 12 outputs only the Jennifer's password again as a sound "Jennifer's password is 'Mount Fuji'."

A third example is a case where a specific user wants to hear the password for print instruction of the user as follows: first, the image forming apparatus 12 outputs sounds "Jennifer's password is 'Mount Fuji'." and "Anne's password is 'Tone River'."; and, if a user wants to hear only the Jennifer's password, the user inputs "Jennifer, password" to the image forming apparatus 12 or the mobile terminal device 14. The image forming apparatus 12 picks up preset words and determines to output only the password again. In the present example, the image forming apparatus 12 outputs again only the Jennifer's password as a sound "Mount Fuji".

A fourth example is a case where a user mispronounces the password as follows: first, the image forming apparatus 12 outputs a sound "The password is 'Mount Fuji'."; and the user inputs "Fuji Xerox" to the image forming apparatus 12 or the mobile terminal device 14. The image forming apparatus 12 examines the rate of concordance between the correct password "Mount Fuji" and the input wrong password "Fuji Xerox". If the rate of concordance is higher than a predetermined level, the image forming apparatus 12 determines that the user has mispronounced the password and outputs again only the password "Mount Fuji" as a sound.

Figure 12:
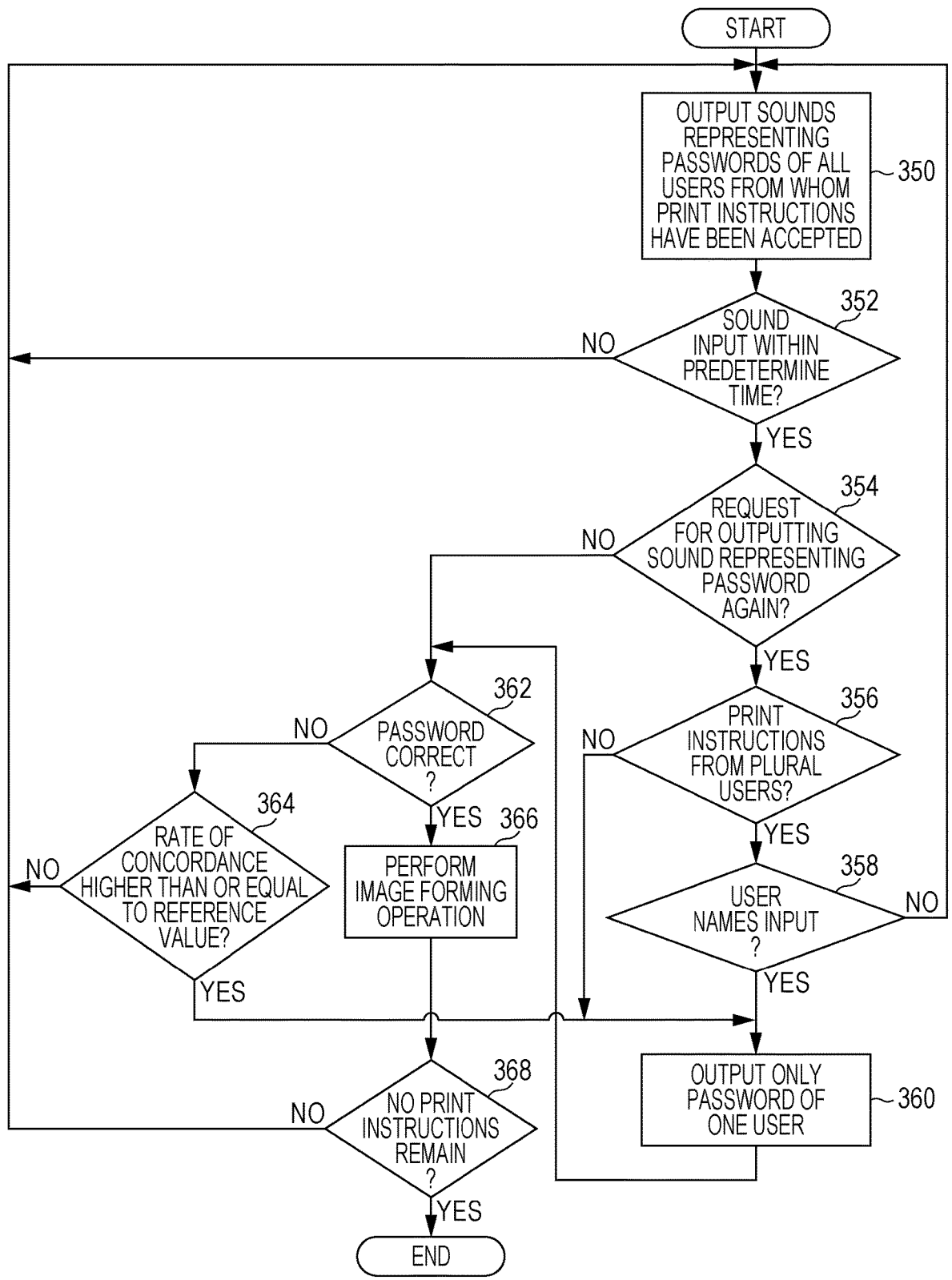
FIG. 12 is a flowchart illustrating an example of a process performed by the image forming apparatus in a case where the process includes outputting a sound of sound authentication information again.

FIG. 12 is a flowchart illustrating an example of a process performed by the image forming apparatus 12 in a case where the process includes outputting a sound of sound authentication information again. The process illustrated in FIG. 12 is performed, instead of the aforementioned steps 306 to 310 in the process illustrated in FIG. 6, after the aforementioned steps 300 to 304 have been performed.

In step 350, the CPU 20A causes the sound input/output unit 46 to sequentially output sounds of passwords for all users from whom print instructions have been accepted, and the process proceeds to step 352.

In step 352, the CPU 20A determines whether an input of a sound has been performed within a predetermined time. If the determination is negative, the process returns to step 350 and the aforementioned operation is repeated. If the determination is affirmative, the process proceeds to step 354.

In step 354, the CPU 20A determines whether the input sound is a request for outputting a sound representing a password again. The determination performed here is determination as to whether the input sound is "What is the password?", "I am Jennifer.", "Jennifer, password", or the like as in the aforementioned examples. If the determination is affirmative, the process proceeds to step 356. If the determination is negative, the process proceeds to step 362.

In step 356, the CPU 20A determines whether there are print instructions from plural users. If the determination is affirmative, the process proceeds to step 358. If the determination is negative, the process proceeds to step 360.

In step 358, the CPU 20A determines whether the users have input user names in the request for repeating the sound output again. If the determination is negative, the process returns to step 350, and the aforementioned operation is repeated. If the determination is affirmative, the process proceeds to step 360.

In step 360, the CPU 20A outputs a sound of only the password of one user again, and the process proceeds to step 362.

In step 362, the CPU 20A determines whether the password is correct. If the determination is negative, the process proceeds to step 364. If the determination is affirmative, the process proceeds to step 366.

In step 364, the CPU 20A determines whether the rate of concordance between the input sound and the password is higher than or equal to a reference value. If the determination is negative, the process returns to step 350, and the aforementioned operation is repeated. If the determination is affirmative, the process proceeds to the aforementioned step 360.

In step 366, the CPU 20A performs an image forming operation corresponding to the print instruction of a user corresponding to the password, and the process proceeds to step 368.

In step 368, the CPU 20A determines whether no print instructions remain. If the determination is negative, the process returns to step 350, and the aforementioned operation is performed on the remaining print instructions. If the determination is affirmative, the process is finished.

Figure 13:
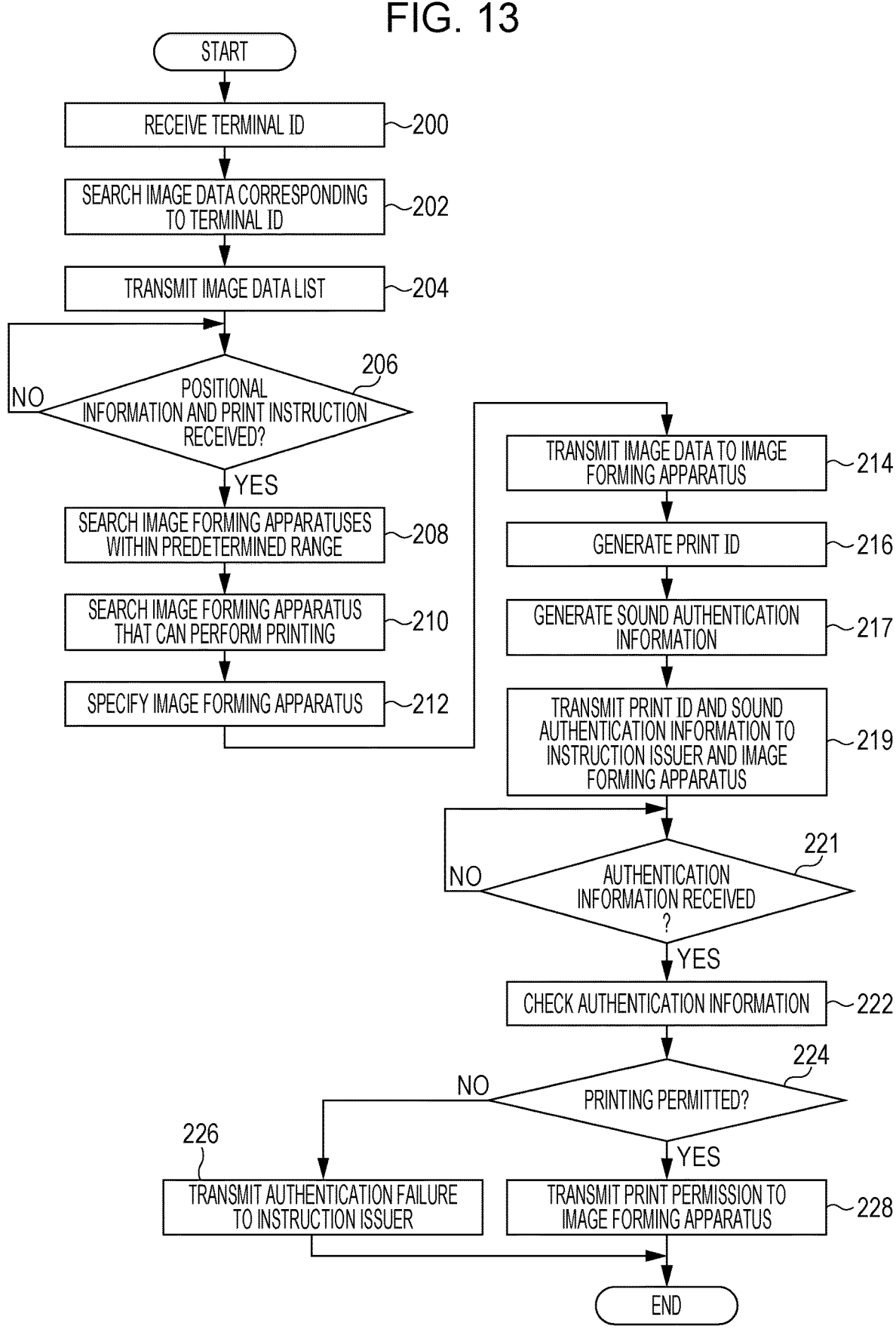
FIG. 13 is a flowchart illustrating an example of a process performed by the print server in a case where the print server generates sound authentication information.
Figure 14:
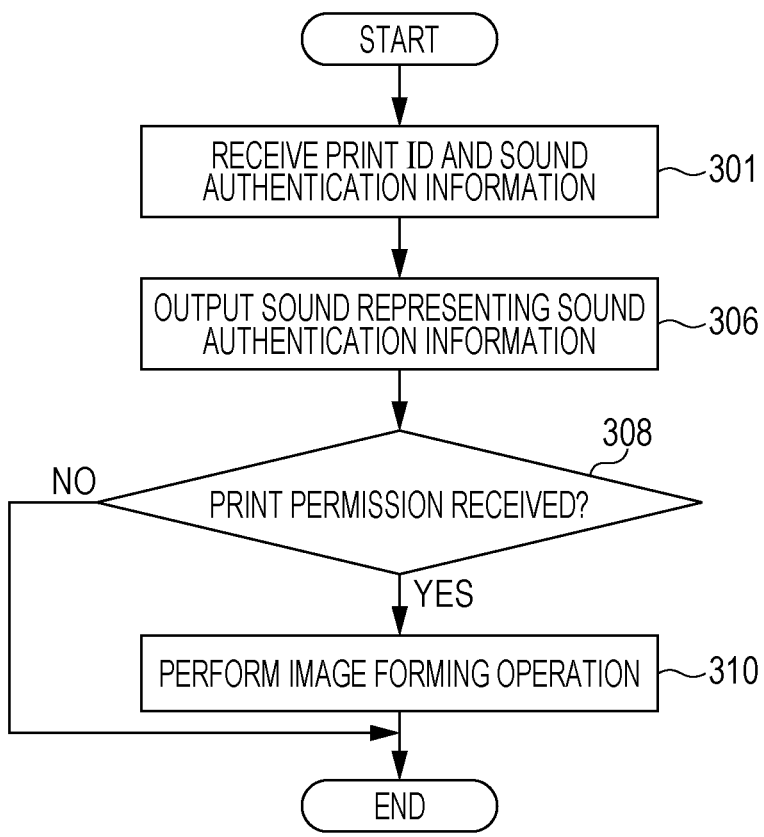
FIG. 14 is a flowchart illustrating an example of a process performed by the image forming apparatus in a case where the print server generates sound authentication information.

In the exemplary embodiment described above, the image forming apparatus 12 generates sound authentication information. However, the print server 16 may generate sound authentication information. In this case, the print server 16 performs a process illustrated in FIG. 13, and the image forming apparatus 12 performs a process illustrated in FIG. 14. In FIG. 13, steps that are the same as those in FIG. 5 are denoted by the same numerals, and descriptions of these steps will be omitted. In FIG. 14, steps that are the same as those in FIG. 6 are denoted by the same numerals, and descriptions of these steps will be omitted.

That is, when the print ID is generated in step 216 in the print server 16, the process proceeds to step 217.

In step 217, the CPU 16A generates sound authentication information and the process proceeds to step 219. The sound authentication information generated here is sound authentication information for permitting printing of a print instruction corresponding to the print ID.

In step 219, the CPU 16A transmits the print ID and the sound authentication information to the mobile terminal device 14 that has issued the print instruction and the image forming apparatus 12, and the process proceeds to step 221.

In step 221, the CPU 16A determines whether authentication information has been received. The determination performed here is determination as to whether authentication information has been received from the mobile terminal device 14. The process waits until the determination becomes affirmative, the process proceeds to step 222, and the aforementioned operation is performed.

In the image forming apparatus 12, the CPU 20A receives the print ID and the sound authentication information in step 301, the process proceeds to step 306, and the operations on and after the aforementioned step 306 are performed.

Figure 15:
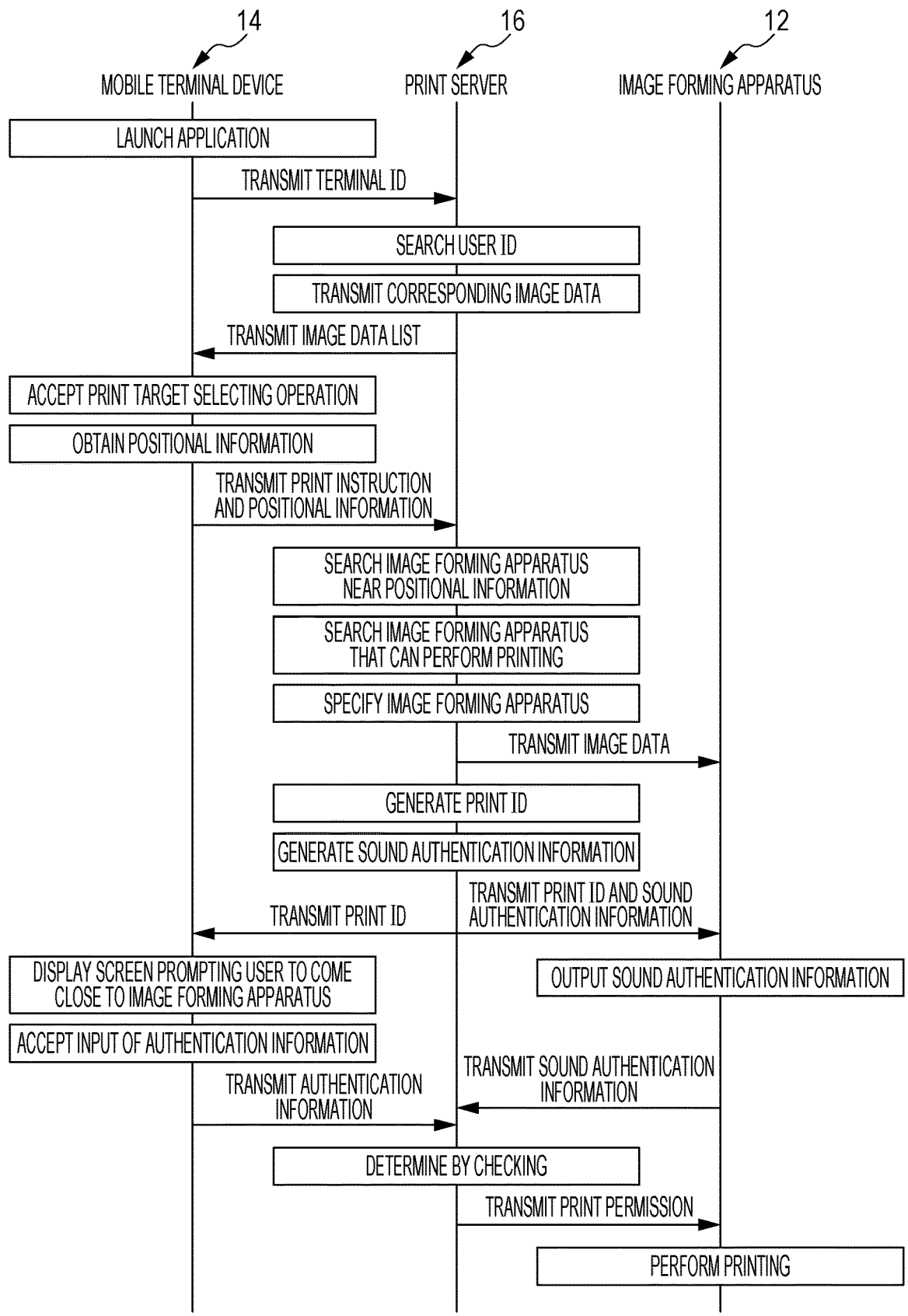
FIG. 15 is a sequence diagram illustrating interactions between the processes performed by the mobile terminal device, the print server, and the image forming apparatus of the information processing system, in a case where the print server generates sound authentication information.

That is, as illustrated in FIG. 15, from launching of the application in the mobile terminal device 14 to generation of the print ID in the print server 16, operations are performed in the same way as in the exemplary embodiment described above.

When the print ID is generated in the print server 16, the sound authentication information is generated and transmitted to the image forming apparatus 12. Thus, in the image forming apparatus 12, the sound authentication information is received from the print server 16, and the sound input/output unit 46 outputs a sound based on the sound authentication information. As described above, the sound may be output at a timing when, for example, a user operates the mobile terminal device 14 to perform instruction for outputting the sound. Alternatively, the image forming apparatus 12 may output a sound when the mobile terminal device 14 corresponding to the terminal ID is detected within a predetermined range from the target image forming apparatus 12. Alternatively, the image forming apparatus 12 may include a human sensor and may output a sound when the human sensor detects approach of a human.

Thereafter, the process is performed in the same way as in the exemplary embodiment, and the image forming apparatus 12 performs printing.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The processes performed in the mobile terminal device 14, the print server 16, and the image forming apparatus 12 according to the exemplary embodiment may be performed by software, hardware, or a combination of software and hardware. The processes performed the mobile terminal device 14, the print server 16, and the image forming apparatus 12 may be stored as programs in storage media and may be distributed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
  accept, from a mobile terminal device carried by a user, identification information that enables identification of the user, positional information of the mobile terminal device, and an image forming instruction,
  generate sound authentication information for authenticating the accepted image forming instruction and cause an image forming apparatus that is present within a predetermined range of the accepted positional information to output a sound representing the sound authentication information, and
  cause the image forming apparatus to perform an image forming operation if the sound authentication information and authentication information that is input by using the mobile terminal device satisfy a predetermined relationship.

2. The information processing apparatus according to claim 1, wherein, if a plurality of the image forming apparatuses are present within the predetermined range, the processor transmits image information to the plurality of image forming apparatuses that are present within the predetermined range, the image information being a target of the image forming instruction.

3. The information processing apparatus according to claim 1, wherein, if a plurality of the image forming apparatuses are present within a predetermined distance and a plurality of the image forming instructions are accepted from a plurality of users, the processor generates the sound authentication information including sound authentication information items that differ from each other in accordance with the plurality of image forming instructions.

4. The information processing apparatus according to claim 2, wherein, if a plurality of the image forming apparatuses are present within a predetermined distance and a plurality of the image forming instructions are accepted from a plurality of users, the processor generates the sound authentication information including sound authentication information items that differ from each other in accordance with the plurality of image forming instructions.

5. The information processing apparatus according to claim 3, wherein the processor generates the sound authentication information that represents a user name corresponding to the identification information and a password or a file name that is a target of the image forming instruction and a password.

6. The information processing apparatus according to claim 4, wherein the processor generates the sound authentication information that represents a user name corresponding to the identification information and a password or a file name that is a target of the image forming instruction and a password.

7. The information processing apparatus according to claim 3, wherein the processor generates the sound authentication information items in different sounds each corresponding to a user represented by the identification information.

8. The information processing apparatus according to claim 4, wherein the processor generates the sound authentication information items in different sounds each corresponding to a user represented by the identification information.

9. The information processing apparatus according to claim 5, wherein the processor generates the sound authentication information items in different sounds each corresponding to a user represented by the identification information.

10. The information processing apparatus according to claim 6, wherein the processor generates the sound authentication information items in different sounds each corresponding to a user represented by the identification information.

11. The information processing apparatus according to claim 3, wherein the processor generates the sound authentication information items at different timings each corresponding to a user represented by the identification information.

12. The information processing apparatus according to claim 4, wherein the processor generates the sound authentication information items at different timings each corresponding to a user represented by the identification information.

13. The information processing apparatus according to claim 5, wherein the processor generates the sound authentication information items at different timings each corresponding to a user represented by the identification information.

14. The information processing apparatus according to claim 6, wherein the processor generates the sound authentication information items at different timings each corresponding to a user represented by the identification information.

15. The information processing apparatus according to claim 1, wherein the processor further accepts a request for outputting the sound representing the sound authentication information again and causes the image forming apparatus to output the sound again.

16. The information processing apparatus according to claim 2, wherein the processor further accepts a request for outputting the sound representing the sound authentication information again and causes the image forming apparatus to output the sound again.

17. The information processing apparatus according to claim 15, wherein the processor causes the image forming apparatus to output a sound again, the sound being included in the sound output from the image forming apparatus and representing a part of a content requested.

18. The information processing apparatus according to claim 16, wherein the processor causes the image forming apparatus to output a sound again, the sound being included in the sound output from the image forming apparatus and representing a part of a content requested.

19. An information processing apparatus comprising:
an accepting unit that accepts, from a mobile terminal device carried by a user, identification information that enables identification of the user, positional information of the mobile terminal device, and an image forming instruction;
a generation unit that generates, in order to authenticate the identification information and the image forming instruction accepted by the accepting unit, sound authentication information that causes an image forming apparatus that is present within a predetermined range of the positional information accepted by the accepting unit to output a sound representing the sound authentication information;
an authentication accepting unit that accepts, from the mobile terminal device, authentication information corresponding to the identification information and the sound authentication information; and
a controller that performs control so as to perform an image forming operation if the authentication information accepted by the authentication accepting unit and the sound authentication information generated by the generation unit satisfy a predetermined relationship.

20. A non-transitory computer readable medium storing a program causing a computer to execute a process for processing information, the process comprising:
accepting, from a mobile terminal device carried by a user, identification information that enables identification of the user, positional information of the mobile terminal device, and an image forming instruction;
generating sound authentication information for authenticating the accepted image forming instruction and causing an image forming apparatus that is present within a predetermined range of the accepted positional information to output a sound representing the sound authentication information; and
causing the image forming apparatus to perform an image forming operation if the sound authentication information and authentication information that is input by using the mobile terminal device satisfy a predetermined relationship.

* * * * *